UNITED STATES PATENT OFFICE.

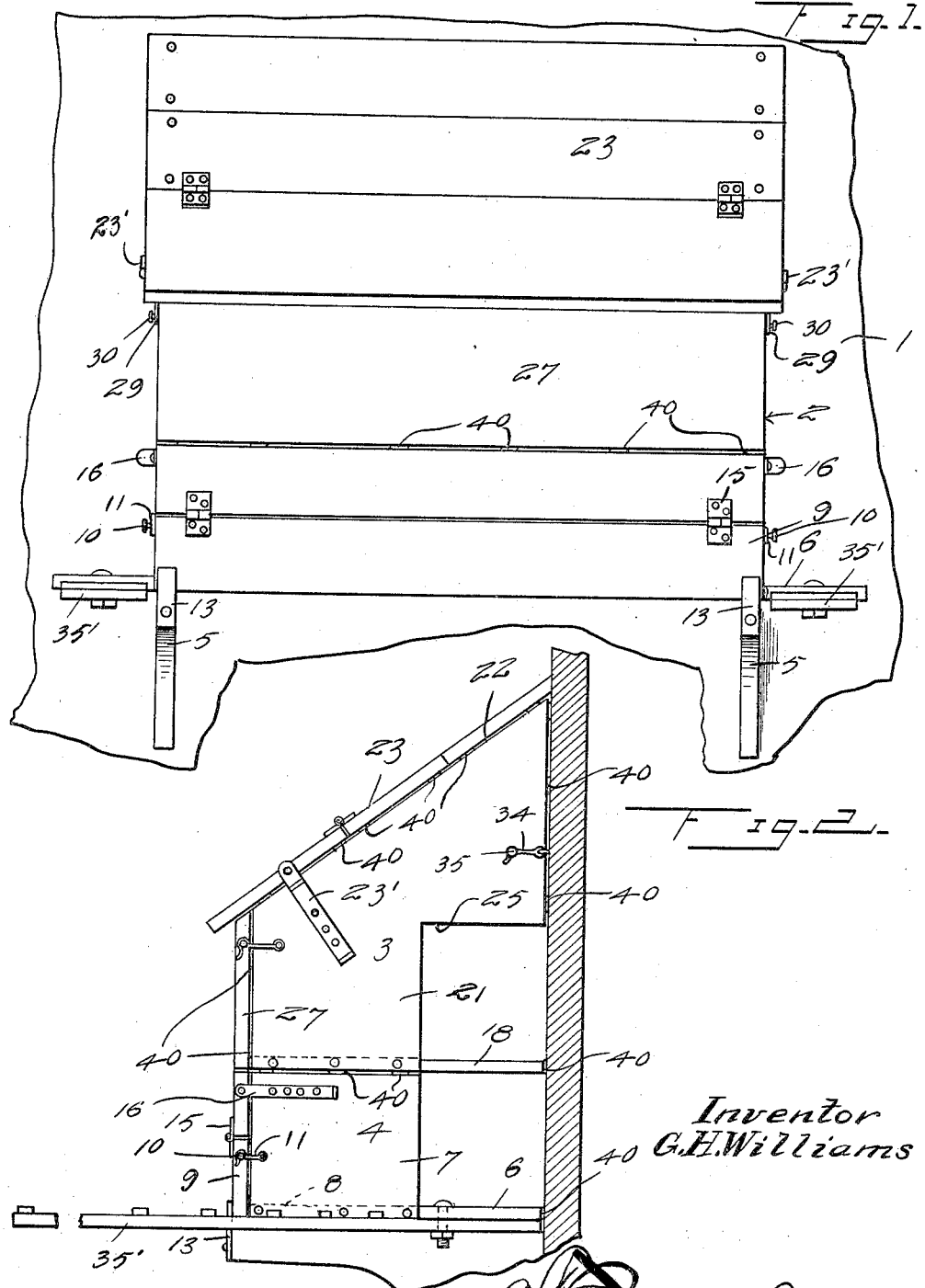

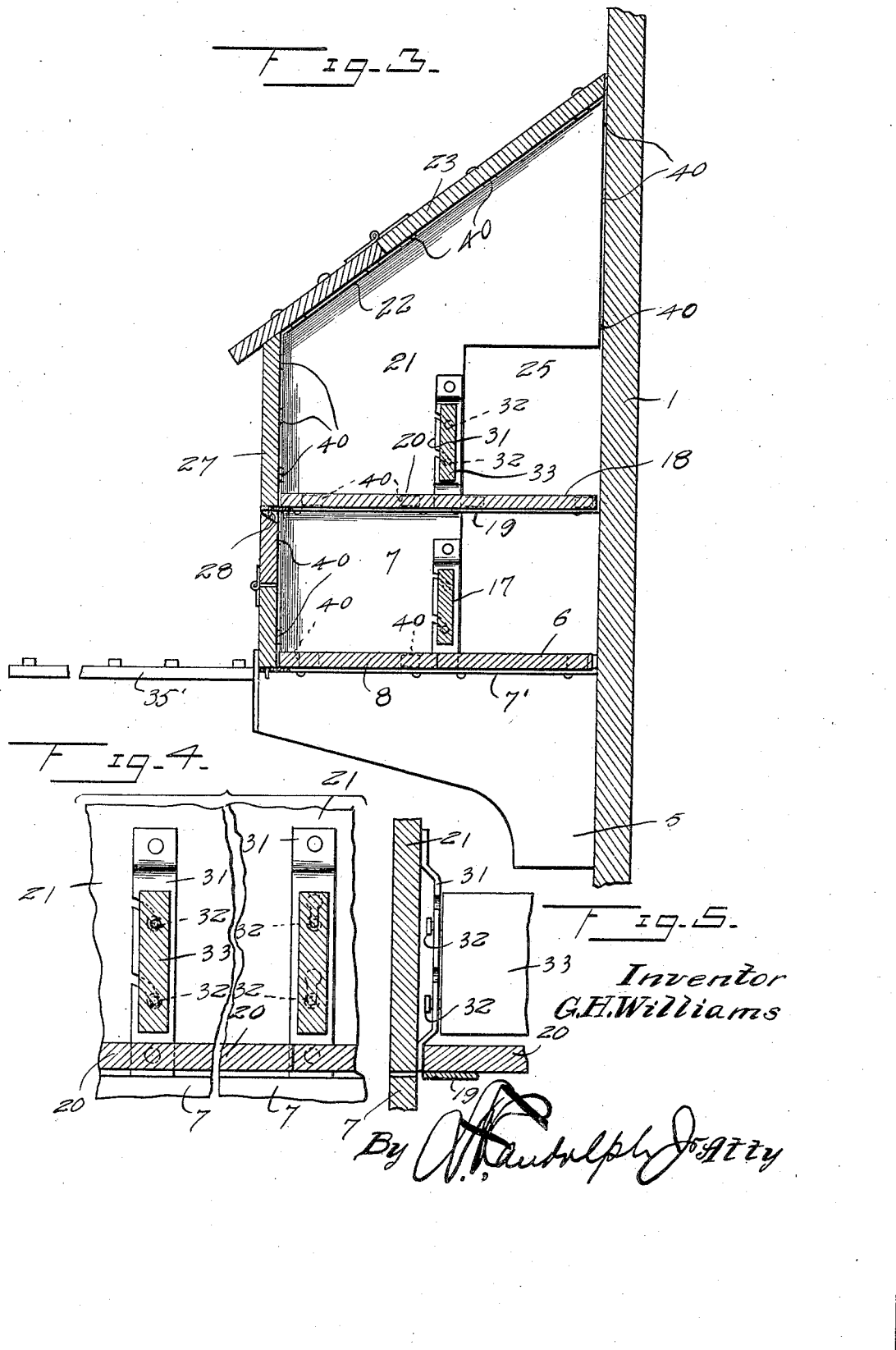

GEORGE H. WILLIAMS, OF KEARNEY, NEBRASKA.

NEST.

1,343,071.  Specification of Letters Patent.  Patented June 8, 1920.

Application filed August 12, 1919. Serial No. 316,944.

*To all whom it may concern:*

Be it known that I, GEORGE H. WILLIAMS, a citizen of the United States, residing at Kearney, in the county of Buffalo and State of Nebraska, have invented certain new and useful Improvements in Nests; and I do hereby declare the following to be a full, clear, and exact description of the invention, such as will enable others skilled in the art to which it appertains to make and use the same.

This invention relates to new and useful improvements in hen nests and has for one of its objects the provision of tiers of nests whereby any number of laying hens can be accommodated and given the desired amount of light required or liked by hens when laying, as well as ventilation, and also hens are prevented from jumping from one tier of nests to another, thus obviating the danger of breaking the eggs in the nests.

Another object of this invention is the provision of means whereby the number of tiers of nests can be increased as desired and also whereby the eggs can be conveniently removed from the nests.

Another object of this invention is the provision of each tier of nests constructed of removable sections so that the device can be conveniently cleaned and which sections are so connected as not to afford insect or mite harbors.

A still further object of this invention is the provision of a hen's nest of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a front elevation of a hen's nest constructed in accordance with my invention, Fig. 2 is an end elevation of the same, Fig. 3 is a transverse sectional view illustrating the tiers of nests and runways therefor, Fig. 4 is a detail view illustrating the means of removably securing the dividing partitions between the nests and the runways to the walls of the device, Fig. 5 is a detail sectional view illustrating the means of detachably securing the partitions in place.

Referring in detail to the drawings, the numeral 1 indicates a wall of a chicken house, to which my invention is adapted to be applied. The nest 2 consists of upper and lower tiers 3 and 4 in this instance, but any number of tiers can be provided by adding tiers to the device in accordance with the construction of the tier 4.

Supporting brackets 5 are secured to the wall 1 of the chicken house and have secured thereon a board forming a runway 6. The brackets 5 project beyond the runway 6 and have secured thereon the end walls 7. Supporting strips 7' are secured to the runway 6 between the brackets 5 and project beyond the runway between the end walls 7 so as to support a flooring 8 on which is adapted to be made the hen nests which are usually made from straw placed upon the flooring. The straw being arranged on the flooring permits the hens to make nests one after another within the lower tier thus doing away with separate compartments for each nest whereby overcrowding is prevented which overcrowding is caused by two or more hens occupying a compartment at the same time. The supporting strips 7' project beyond the flooring 8 and are adapted to support a front wall 9 consisting of upper and lower sections. The lower section is provided with pins adapted to extend through openings in the supporting strips 7' and has secured to its ends eye screws 10 adapted to receive hooks 11 on the end walls 7 whereby said sections can be readily and conveniently removed when desired. Cleats 13 are secured to the ends of the brackets 5 and project beyond the upper edge thereof to engage the front face of the lower section of the front wall 9 to further secure the same in place. The upper section is connected to the lower section by means of hinges 15 so that said upper sections can be swung to open and closed position without affecting the lower section. Fastening strips 16 are pivoted to the ends of the upper section and are provided with a plurality of openings, any one of which is adapted to receive pins on the end walls 7 so that the upper section can be supported or held in various adjusted positions so as to give light and ventilation to the nests arranged on the flooring 8. When it is desired to remove eggs from the nests, the upper section of the front wall 9 is swung outwardly permitting a person to insert their hands to remove the eggs.

The end walls 7 have secured thereto brackets provided with openings to receive pins carried by the ends of a partition 17. This partition 17 is of a less height than the end walls 7 and is adapted to prevent the straw forming the nest from being scattered out of the nest onto the runway 6 but will permit the hens to readily jump or step over into the nest from the runway. This partition 17 can be readily removed whenever desired.

The upper tier 3 is arranged over the lower tier 4 and consists of a board forming a runway 18 which is identical in construction to the runway 6. Supporting strips 19 are secured to the runway 18 and support a flooring 20 which supports the nest to the upper tier. The flooring 20 has secured thereto end walls 21 which rest upon the upper edge of the end walls 7 of the lower tier and have their upper portions cut at an incline, as illustrated at 22 for supporting an inclined cover 23. The cover 23 consists of a plurality of sections some of which are secured to the incline of the end walls by fasteners while one of the other sections is hinged to the lowermost rigidly secured section and is equipped with fastening members 23'. The fastening members 23' are provided with a plurality of openings adapted to receive pins carried by the end walls 21 so that the lower section of the cover can be adjusted and supported in such a position. The end walls 21 are provided with doorways or cut-out portions 25 so that the hens can pass through said end walls to the runway of the upper tier. The supporting strips of the upper tier project beyond the flooring 20 and support a front wall 27 which is provided with pins 28 in its lower edges to extend through openings in the supporting strips. The front wall is detachably secured to the end walls 21 by means of hooks 29 fitting within eye screws 30 on said front wall. The upper edge of the front wall is beveled so that the lower section of the cover 22 can rest evenly thereon and project beyond the front wall.

Brackets 31 are secured to the inner faces of the side walls 21 and are provided with slots to receive pins 32 carried by a partition 33. This partition 33 is adapted to prevent the straw of the nests upon the flooring 20 from being scattered over the runway of the upper tier by the hens. The partition can be conveniently removed when desired. The side walls 21 are detachably secured to the wall 1 of the chicken house by means of hooks 34 engaging eye screws 35. The lower tier has bolted or otherwise secured to its runway 6, runs 35 so that the hens can readily pass up onto the runway from the flooring or ground of the chicken house.

All of the walls, flooring, runways, nests and cover of the device are supported in spaced relation to each other by projections 40 so as to leave a small space between each of the parts of the device which will prevent harboring of mites or insects between the parts. It is a well known fact that mites or insects harbor between parts that are placed in close relation.

From the foregoing description taken in connection with the accompanying drawings, it will be noted that any number of tiers can be provided or assembled and that the tiers can be conveniently removed whenever desired and also that each tier can be separated so that each and every part can be thoroughly cleansed.

Further the inclined cover to the device will prevent chickens from roosting on top of the device thus aiding in keeping the device in a sanitary condition and the device also will, when constructed in accordance with the foregoing description, keep the eggs when laid in a clean and sanitary condition obviating the necessity of washing the eggs before shipment.

While I have shown and described the preferred embodiment of my invention, it will be understood that minor changes in construction, combination, and arrangement of parts may be made without departing from the spirit and scope of the invention as claimed.

Having thus described my invention, what I claim is:—

A device of the character described including a wall of a building, brackets secured to the wall of the building, a runway secured to said brackets, a nest flooring secured to the runway, end walls secured to the brackets and the nest flooring, a removable partition secured to the end walls, a second runway arranged above the first named runway, a nest flooring secured to the second named runway, end walls secured to the second named nest flooring and detachably secured to the wall of a building and having cut out portions forming doorways to the upper runway, a cover secured to the second named end walls and having a hinged section, means adjustably securing the hinged section of the door to the second named end walls, a second partition secured to the second named end walls, a front wall having a hinged section detachably secured to the first named end walls, means adjustably securing the hinged section to the first named end walls, a front wall detachably secured to the second named end walls and having its upper edge beveled to be engaged by the movable section of the cover.

In testimony whereof I affix my signature in presence of two witnesses.

GEORGE H. WILLIAMS.

Witnesses:
C. H. PRATT,
VIOLA PRATT.